P. P. MAST & C. O. GARDINER.
Improvement in Grain Drills.

No. 125,314. Patented April 2, 1872.

Witnesses.
Harry King.
Phil. T. Dodge

Inventors.
P. P. Mast, &
C. O. Gardiner
by Dodge & Son
Attys 125,314

UNITED STATES PATENT OFFICE.

PHINEAS P. MAST AND CHARLES O. GARDINER, OF SPRINGFIELD, OHIO, ASSIGNOR TO P. P. MAST & CO., OF SAME PLACE.

IMPROVEMENT IN GRAIN-DRILLS.

Specification forming part of Letters Patent No. 125,314, dated April 2, 1872.

SPECIFICATION.

*To all whom it may concern:*

Be it known that we, PHINEAS P. MAST and CHAS. O. GARDINER, of Springfield, in the county of Clark and State of Ohio, have invented certain Improvements in Grain-Drills, of which the following is a specification, reference being had to the accompanying drawing.

Our invention consists in a novel construction of the feeding device of a grain-drill, whereby it can be so adjusted as to feed large and small grains with equal facility, and at the same time regulate the quantity sown with great ease and accuracy, all as hereinafter more fully explained.

Figure 1:
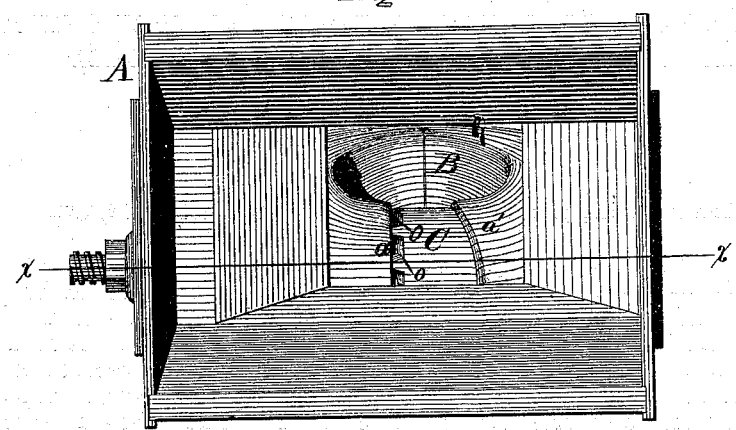
Figure 2:
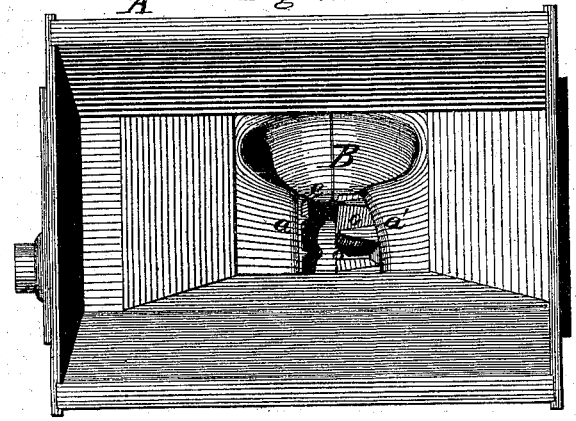
Figure 3:
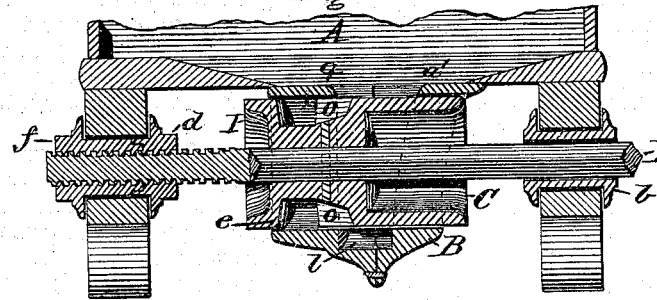
Figure 4:
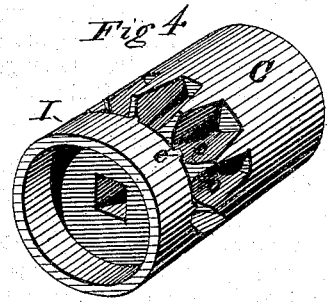

Figure 1 is a top-plan view of a seed-hopper with one of our improved feeding devices applied. Fig. 2 is a similar view, showing the feed-roll adjusted for feeding larger grains. Fig. 3 is a longitudinal vertical section of the same; and Fig. 4 is a perspective view of the feed-roller detached.

In constructing our improved device we first make a feed-roller, C, the general form of which is shown clearly in Fig. 3. This roller is formed with its body of a smooth cylindrical shape, with a groove or depression around it near one end. The portion I of the roll has its face adjoining the groove nearly at right angles to its exterior, and has formed thereon a series of radial projections or ribs, e, these ribs projecting but slightly, as shown in Figs. 2, 3, and 4. Opposite to these we form a series of pockets or cavities, o, as shown in Figs. 2 and 4; these cavities being largest at the point where they join the circumferential groove, and from thence grow gradually narrower and more shallow to their termination at the right. The feed-roll thus formed is turned off on its periphery so as to form a true cylinder over its whole length, except where the groove and pockets are made in it, these being formed in the process of casting the roll. It is also hollowed out internally at each end to save metal and make it lighter. Having thus formed our feed-roll, we then construct a case or seed-cup, B, within which the roll is fitted, the cup having a hole made transversely through its sides of such a size as to permit the roll to be inserted therein, and, while fitting close enough to prevent the escape of grain, still permitting the roll to turn freely, and also to be moved bodily endwise either to the right or the left. This seed-cup is made flat on its upper surface around its outer edge, so as to be easily secured to the bottom of the hopper A, as shown in Figs. 1, 2, and 3. This cup B is made with a large mouth or opening in its upper face, which opening is mainly on the front side of the roll, and extends down around underneath the roll, in a gradually-converging form, and terminating at the rear in an opening, $l$, through which the grain is fed out into seed-tubes in the usual manner. The mouth or opening in the top of the cup, as shown in Figs. 1 and 2, also extends across the roller, at right angles thereto, so as to permit the grain in the hopper to rest directly upon the roller. This portion of the opening has its wall on the left-hand side made at right angles to the length of the roll, while that on the right-hand side is slightly inclined or curved, as shown in Figs. 1 and 2, and by dotted lines in Fig. 3, thereby gradually narrowing the opening or throat until it terminates in the discharge-orifice $l$.

When the roll and cup are thus formed and put together, it will be seen that, as the roll is revolved, the grain which rests upon it and fills the pockets $o$ and the adjoining groove will be carried around down into the throat of the cup, and forced out through the orifice $l$ at the rear.

Now, by adjusting the roll to the right or left, so as to bring its groove or pockets more or less into the open throat of the cup, we can regulate the quantity of grain that it will discharge as we please. When it is adjusted to the position shown in Fig. 2 it will feed to its utmost capacity, and, in addition to this, it will, when thus adjusted, feed not only oats, but also the larger grains—such as corn, peas, and beans. By shoving the roll to the left, as represented in Figs. 1 and 3, the groove, and also a portion of the pockets $o$, are slid under the wall $a$ of the cup, which thereby covers them and prevents any grain from being fed out by that portion of the roll, only those portions of the pockets which are left uncovered coming opposite the orifice $l$ and discharging their contents; the groove and that portion of the pockets covered by the wall $a$ only serving in that case to carry the grain therein round and round within the case, but not discharging it. In sowing wheat and similar small grains the roll will be adjusted so as to leave only the pockets o uncovered, and usually, even, they will not be entirely uncovered. By shoving the roll to the left so as to decrease the size of the uncovered portion of the pockets, the quantity of the grain fed out may be regulated as desired; and the gradually-decreasing size of the pockets will cause the quantity fed out to decrease more and more rapidly as the roller is adjusted or moved to the left, the wall a serving always as a stop or cut-off to the grain entering the pockets.

By this construction and arrangement of the parts we produce a most efficient feeding device, and that is capable of sowing all kinds of grain, and that can be instantly adjusted to sow any desired quantity.

It will, of course, be understood that in applying our feeding device to a grain-drill a series of these cups and rolls is arranged underneath the hopper, as is usual in this class of machines.

To operate the rolls they are all secured rigidly to a shaft, D, so as to turn with it, motion being imparted to the shaft in any desirable manner.

In order, however, to prevent the rolls from binding in their cups, and to permit them all to be easily adjusted at once, we mount the shaft D loosely in circular flanged hubs b, which turn with it in suitable bearings on the frame; the shaft being represented as square, so as to cause the hub to turn with it, although fitting loosely therein. At one end this hub is made in two parts, f and d, as shown at the left in Fig. 3, and they are provided with an internal screw-thread fitting a thread formed on the shaft, so that, by turning this nut or hub on the shaft, the latter with the entire series of rolls, can be moved either to the right or left, as may be desired. When adjusted, the nuts d and f are screwed tight up against each other, thereby locking them securely in place, and preventing any accidental movement of the rolls in their cups.

In applying our feeding devices to grain-drills the shaft or some other part will have marked thereon graduations or points, by which the rolls can be readily set or adjusted to sow any given quantity.

Having thus described our invention, what we claim is—

1. The feed-roll C, consisting of a cylindrical body having formed in its periphery a circumferential groove and a series of seed-cells, o, one end of which open into said groove, substantially as described.

2. The feed-roll C, consisting of a cylindrical body having a circumferential groove and a series of seed-cavities or cells gradually decreasing in width and depth longitudinally, substantially as and for the purpose set forth.

3. The combination of a feed-roll, having a series of seed-cells in its periphery, with a seed-cup or case, substantially as described, whereby the stationary side of said case shall serve to regulate the feeding-capacity of the cells in the roll, when the latter is adjusted longitudinally therein, as set forth.

PHINEAS P. MAST.
CHARLES O. GARDINER.

Witnesses:
GEO. ARTHUR,
J. W. JARRETT.